United States Patent [19]

Berquist

[11] Patent Number: 4,995,499
[45] Date of Patent: Feb. 26, 1991

[54] METHOD AND APPARATUS FOR REDUCING THE VELOCITY OF PARTICULATE MATTER

[76] Inventor: Lloyd G. Berquist, Rte. One, Box Fifty-Four, Loomis, Nebr. 68958

[21] Appl. No.: 451,130

[22] Filed: Dec. 15, 1989

[51] Int. Cl.[5] .............................................. B65G 11/20
[52] U.S. Cl. ........................................ 193/32; 193/12; 193/29; 198/534; 414/299
[58] Field of Search .................. 193/12, 32, 3, 29; 198/534, 525; 414/299; 239/486, 487, 542, 500, 501, 523, 524; 138/42

[56] References Cited

U.S. PATENT DOCUMENTS

| | | | |
|---|---|---|---|
| 232,597 | 9/1880 | Coleman | 193/3 |
| 1,408,466 | 3/1922 | Pendry | 193/3 |
| 4,027,760 | 6/1977 | Somerville | 198/525 |

Primary Examiner—Joseph E. Valenza
Attorney, Agent, or Firm—Sean Patrick Suiter

[57] ABSTRACT

A method and apparatus for reducing the velocity of a stream of particulate matter so as to prevent damage to the particulate matter. The present invention includes a chamber having an inlet port adapted for accepting particulate matter from a conduit, and an outlet port adapted for discharging particulate matter. The chamber consists of a curvilinear support surface with opposing ends connected to the inlet and outlet ports. The curvilinear support surface includes an ascending arcuate portion between the inlet and outlet ports. The velocity of a stream of particulate matter is reduced as it traverses the ascending arcuate portion of the curvilinear support surface.

14 Claims, 8 Drawing Sheets

METHOD AND APPARATUS FOR REDUCING THE VELOCITY OF PARTICULATE MATTER

BACKGROUND OF THE INVENTION

The present invention is directed generally to an improved flowable substance braking device and more particularly to an apparatus and method of controlling a stream of particulate matter falling in a downwardly inclining conduit.

Particulate matter, such as grain, is moved many times from its initial harvest point to its eventual processing point. Grains such as wheat, corn, soybeans, and the like are usually hauled by truck to storage bins. The grain is emptied into a pit where it is lifted by a vertical conveyor leg, passed through a distributor, down an inclining conduit, and then into a grain storage bin.

In order to accommodate several bins the vertical conveyor leg must be high enough so that the incline of the conduits running from the distributor to storage bins farthest from the leg will be steep enough for the grain to flow easily. This incline must be at least 30° for dry grain, and at least 45° for grain with a high moisture content.

It is apparent that the slope of the conduit to those storage containers farthest from the distributor will dictate the incline of the conduit to all other containers. Thus, those storage containers nearly abutting the leg will have conduits inclined to an almost vertical angle.

Since a kernel of grain traveling down a generally vertical conduit will fall with a negligible amount of friction its velocity may be calculated from the following expression $$v_f = \sqrt{(2gh)},$$

where $v_f$ is the final velocity, g is the acceleration of gravity (9.8 m/s$^2$), and h is the length of an almost vertical conduit.

The velocity of a kernel of grain will be reduced by friction forces as it travels down a conduit positioned at an incline. The acceleration of such a particle may be calculated according to the following expression $$a = g \sin \Theta - (f/m),$$

where a is the particle's acceleration, g is the acceleration of gravity (9.8 m/s$^2$), $\Theta$ is the incline angle of the conduit relative to the horizon, f is the frictional force, and m is the particle's mass. The velocity of such a particle may be calculated according to the following expression $$v_f = \sqrt{(2as)},$$

where s is the length of the inclined conduit.

It can be readily observed that the velocity of the particles discharged into storage bins will depend on the proximity of the storage bin to the leg. Therefore, velocity is dependent on the length and incline of the conduit.

It is well known, to those involved in the art of handling grain, that a decrease in handling velocity means a decrease in damage to grain and grain handling equipment. It is also known that the primary source of this damage occurs from kernel-container and kernel-kernel collisions as grain is discharged from a conduit and into a storage or transport container.

Likewise, it is well known that the damage suffered by kernels is proportional to the velocity of the grain as it is discharged from conduits and into containers. Since a bushel of grain containing fractured kernels has a reduced market value it has long been the object of grain handlers to discover an economical method for reducing grain handling velocities.

Known to the art are solutions that fall within one of the following two categories. The first category of solution revolves around redesigning grain storage facilities by either reducing leg height or placing storage containers farther from the leg. Under either configuration fewer storage containers may utilize the same leg. This inherent disadvantage prevents this category of solution from being practical.

The second category of solution known to the art is also uneconomical. The devices comprising this category seek to reduce grain velocity by controlling grain flow. Prior art devices of this genre are illustrated by Wood, U.S. Pat. No. 4,159,151, Beaver, et al., U.S. Pat. No. 4,397,423, and Burnett, U.S. Pat. No. 4,342,383. All of these devices are costly to install, operate, and maintain.

Figure 3:
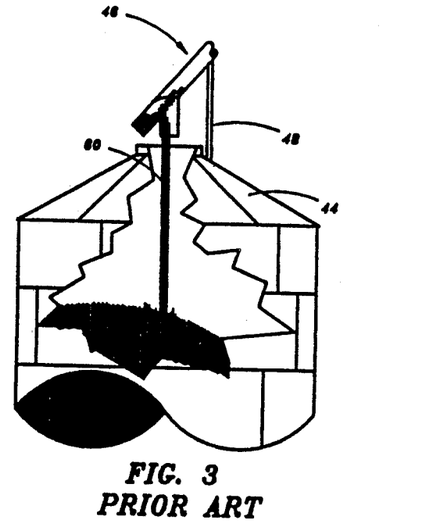
FIG. 3 is a partial sectional side elevational view of a prior art device mounted above a grain storage bin.
Figure 4:
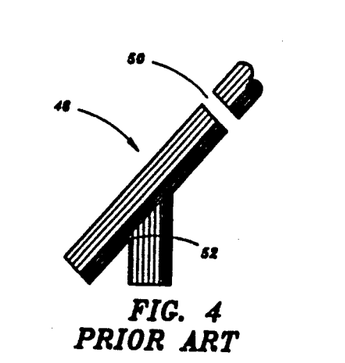
FIG. 4 is a partial sectional side view a the prior art device shown in FIG. 3.

Additionally, in order to reduce the velocity of particulate matter many millwrights install grain cushions 46 like that shown in FIGS. 3 and 4. Such devices 46 are fashioned by plugging the end of a piece of conduit at one end and attaching the other end 50 to the existing conduit. A hole is then made into the attached piece and another piece of conduit is welded on the attached piece as an outlet port. Particulate matter entering the device 46 first fills the chamber on the plugged end of the attached piece. Subsequent particles then bounces off of the particulate matter trapped in the plugged end before it is discharged from the outlet port.

While these devices are fairly inexpensive they wear out quickly at point 52, and particulate matter entering the device is damaged as it undergoes particle-particle collisions with particles trapped in the plugged end of the device 46.

Accordingly, a principal object of the present invention is to provide an improved method and apparatus for reducing the velocity of particulate matter Another object of the invention is to provide a method and apparatus for controlling the velocity of particulate matter in both small and large grain handling facilities.

Still another object of the invention is to provide a method and apparatus for economically reducing the velocity of particulate matter.

Still another object of the invention is to provide a method and apparatus that is easy to install in existing grain handling facilities.

Yet another object of the invention is to provide a method and apparatus for reducing the velocity of particulate matter that will provide trouble free operation.

Yet another object of the invention is to provide a method and apparatus that is adaptable to a wide range of grain handling conditions.

Another object of the invention is to provide an apparatus that is easy to manufacture.

Another object of the invention is to provide an apparatus that does not significantly reduce the rate at which particulate matter may be handled.

Yet another object of the invention is to provide an apparatus that will increase the rate at which grain may be safely unloaded from a grain storage facility.

Yet another object of the invention is to provide an apparatus that will significantly reduce damage to particulate matter moving into and out of particulate matter storage facilities.

SUMMARY OF THE INVENTION

The present invention includes a chamber having an inlet port adapted for accepting particulate matter from a conduit, and an outlet port adapted for discharging particulate matter. The chamber consists of a curvilinear support surface with opposing ends connected to the inlet and outlet ports. The curvilinear support surface includes an ascending arcuate portion between the inlet and outlet ports.

Particulate matter falling through a conduit accelerates generally in a path parallel to the conduit surface. Particulate matter discharged from a conduit and into the inlet port of the present invention undergoes a series of glancing collisions with the curvilinear support surface. With each glancing collision the kinetic energy is transferred from the particulate matter to the support surface. The reduction in kinetic energy may be calculated from the following expression $$\tfrac{1}{2}m(v_{\perp 1}^2 + v_{\parallel 1}^2) - \tfrac{1}{2}m(v_{\perp 2}^2 + v_{\parallel 2}^2) - \tfrac{1}{2}m(v_{\perp 3}^2 + v_{\parallel 3}^2) \ldots - \tfrac{1}{2}m(v_{\perp n}^2 + v_{\parallel n}^2),$$

where m is the particle's mass, $v_\perp$ is the perpendicular component of the particle's velocity, and $v_\parallel$ is the parallel component of the particle's velocity.

Prior to the first glancing collision between a particle and the curvilinear surface $v_\parallel$ will be greater than zero, and $v_\perp$ will be equal to zero. With each successive collision $v_{\parallel n}$ will decrease and $v_{\perp n}$ will increase so that a particle will follow a path generally parallel to the curvilinear support surface. Since the kinetic energy of a particle is depleted with each glancing collision the sum of $v_{\parallel x+1} + v_{195\ x+1}$ will be less than the sum of $v_{\parallel x} + v_{\perp x}$. Thus, it may be said that the present invention reduces the velocity of particulate matter without damage by causing particles to undergo a series of glancing collisions.

Also, since the particle's kinetic energy is depleted after each glancing collision the curvilinear surface may be formed so that the radius of curvature gradually decreases. In this way the velocity of particulate matter may be safely reduced within a compact area.

DESCRIPTION OF THE PREFERRED EMBODIMENT

Figure 22:
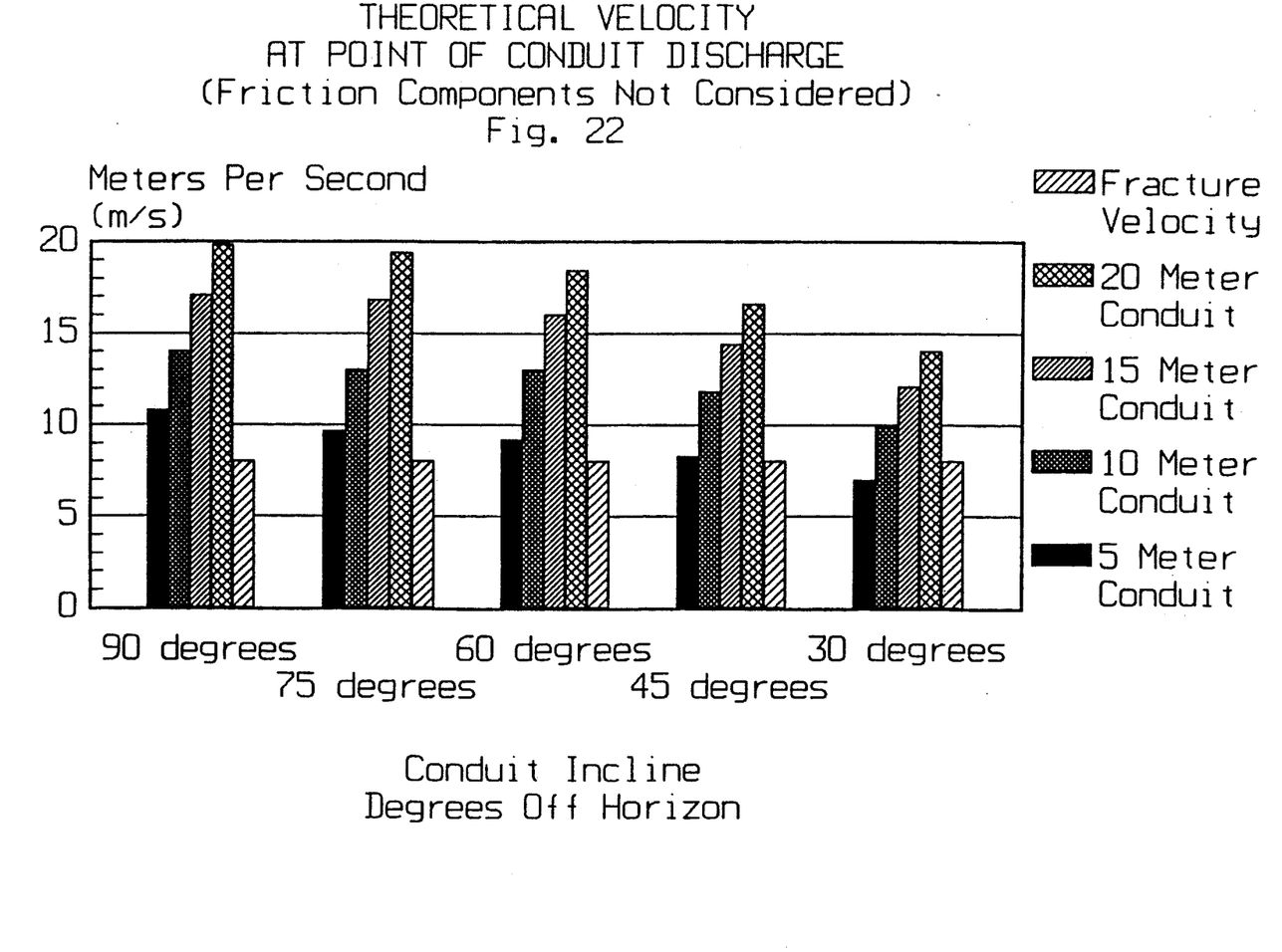
FIG. 22 is a chart of conduit length and incline versus particle discharge velocity.

It is known in the art that there is a high probability that grain will be damaged if it strikes a surface largely perpendicular with its path at a velocity greater than 8 meters per second (m/s). FIG. 22 graphically depicts conduit configurations likely to produce grain discharge velocities exceeding 8 m/s.

The particulate matter velocity reduction apparatus 10 may be installed on conduit configurations that produce velocities likely to damage grain.

The apparatus 10 includes a braking chamber 12 having an inlet port 14 for accepting particulate matter 60 from a conduit 42, and outlet ports 16 and 18 for continuously discharging particulate matter 46 flowing through the chamber 12. The chamber 12 has a curvilinear support surface 20 sandwiched between side walls 28 and 30.

Figures 12, 13:
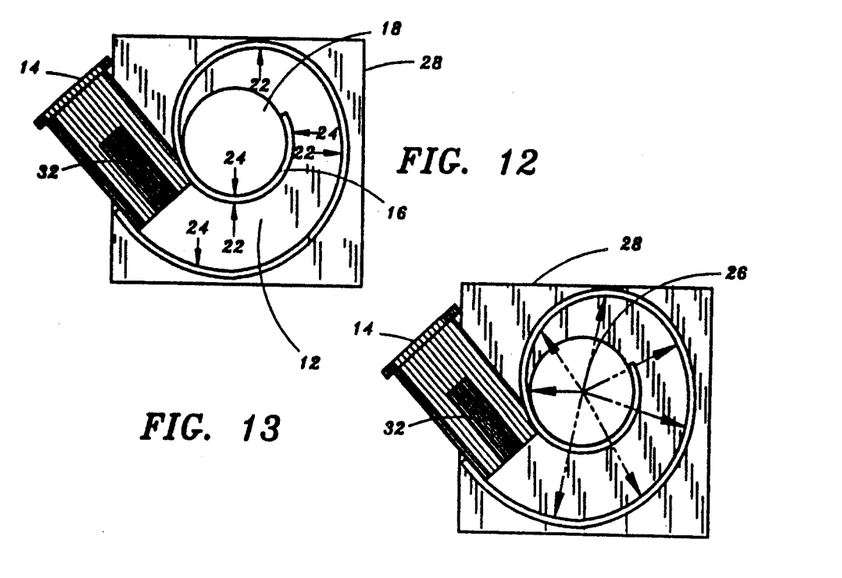
FIG. 12 is a partial sectional side elevational view of the FIG. 1 embodiment showing the braking chamber and curvilinear support surface.
FIG. 13 is a partial sectional side elevational view of the FIG. 1 embodiment showing the gradual reduction in the radius of curvature in the curvilinear support surface.

As shown in FIG. 13 the radius of curvature 26 of the curvilinear support surface 20 decreases incrementally between the inlet 14 and outlet ports 16 and 18 so as to form a spiral providing both the upper and lower surfaces 22 and 24 of the braking chamber 12.

Figure 2:
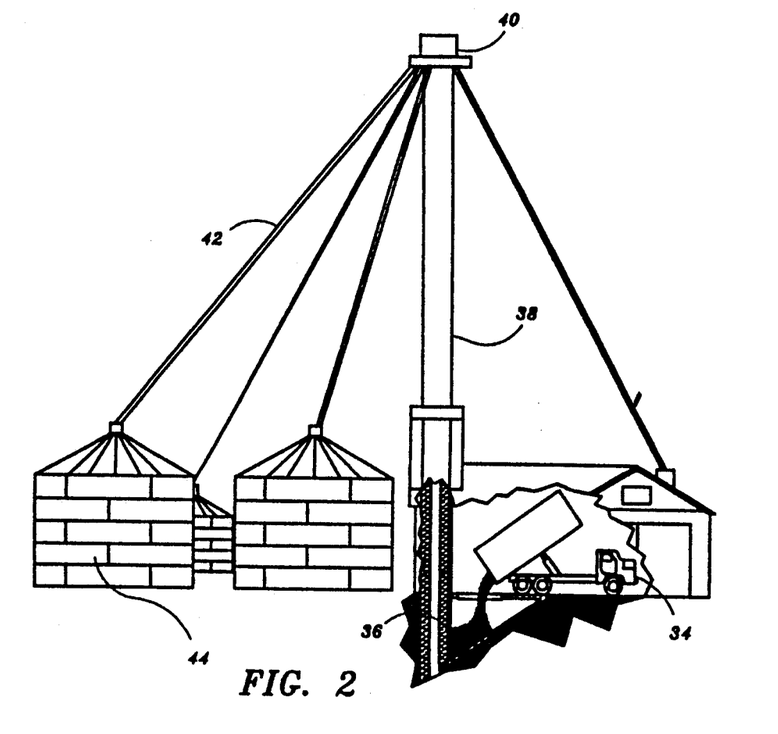
FIG. 2 is a perspective view of a small grain handling facility.

FIG. 2 shows a small grain handling facility like that found at farms and grain elevators. After harvest, grain may be brought in by trucks 34 where the grain is dumped into a grain pit 36. There the grain is moved from the pit 36 to a distributor 40 via a vertical conveyor leg 38. The grain is then directed by the distributor 40 to one of several conduits 42 where it falls through a conduit and into a storage bin 44.

Figure 5:
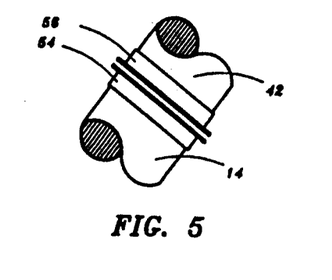
FIG. 5 is a side view showing a pair of collar rings 54 and 56 for connecting the device to a conduit.
Figure 6:
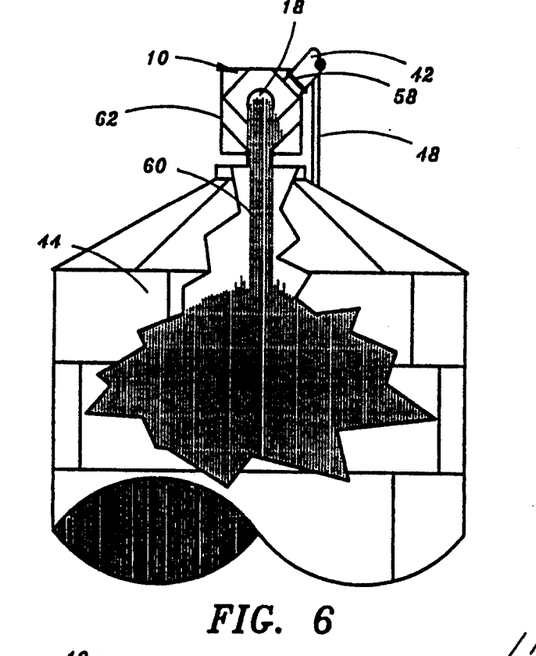
FIG. 6 is a partial sectional side elevational view showing the preferred embodiment mounted for discharging particulate matter into a grain storage bin.
Figure 8:
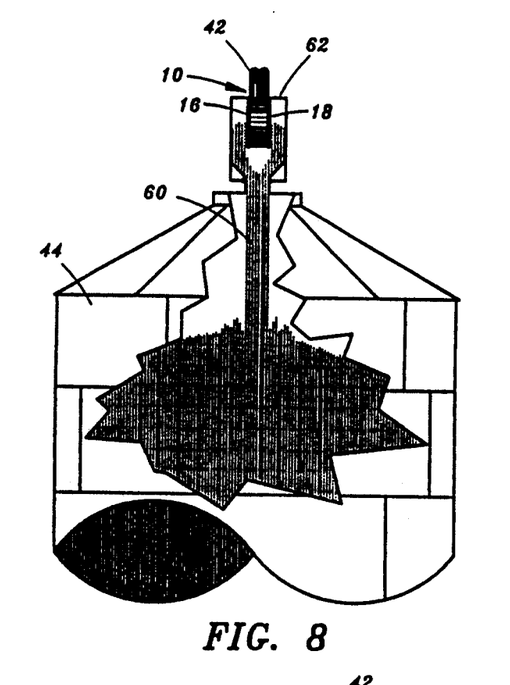
FIG. 8 is a partial sectional front elevational view showing the preferred embodiment mounted for discharging particulate matter into a grain storage bin.

In order to reduce the velocity of the grain the apparatus 10 may be installed at the lower end of a conduit 42. The inlet port 14 is adapted for connection to the conduit by a set of collar rings 54 and 56 (FIG. 5), a weld, or the like. So that grain being discharged from the outlet ports 16 and 18, of the apparatus 10, is not exposed to the elements, it may be installed inside a storage bin 44, or may be placed in a housing 62 braced 48 above a storage bin 44 as shown in FIGS. 6 and 8.

FIGS. 1, 6, 7, 8, 9, 10, 11, 12, and 13 show a preferred embodiment of the apparatus 10. FIG. 13 shows the incremental decrease in the radius of curvature 26 of the curvilinear support surface 20. The rate at which the radius of curvature 26 is decreased may be controlled at the time of manufacture for any grain handling condition.

Figure 1:
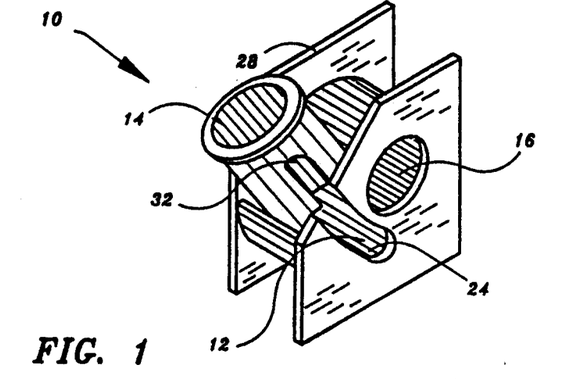
FIG. 1 is a perspective view of a preferred embodiment of the invention.
Figure 7:
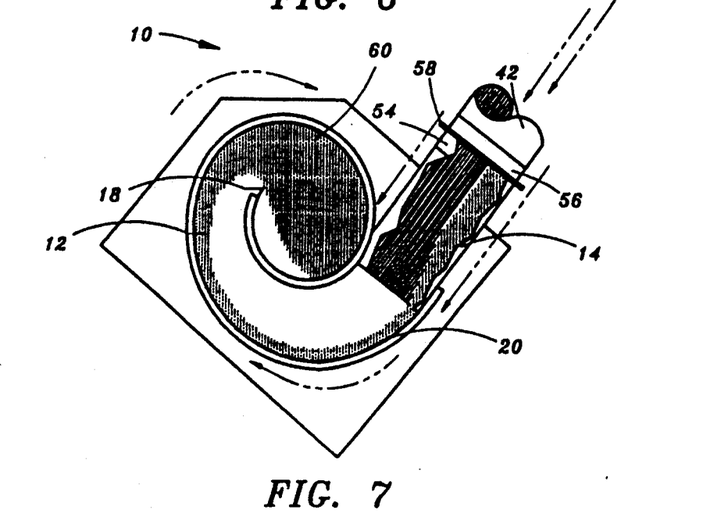
FIG. 7 is a partial sectional side view showing particulate matter flowing through the embodiment of FIG. 1.
Figure 9:
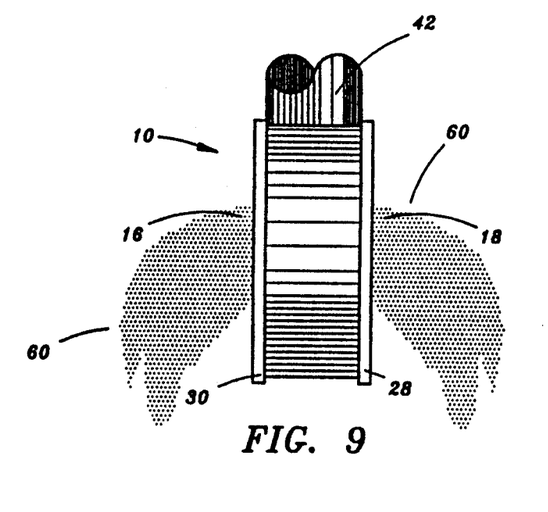
FIG. 9 is a partial front elevational view showing particulate matter discharging from the outlet ports of the FIG. 1 embodiment.
Figure 10:
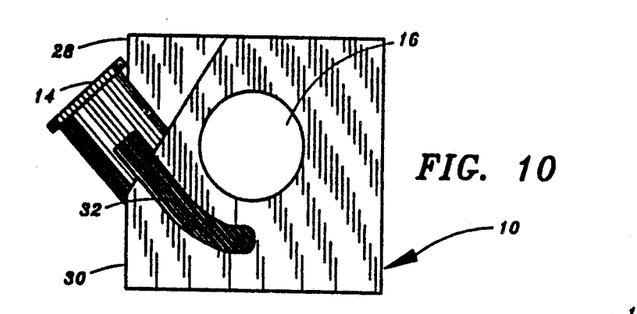
FIG. 10 is a side elevational view showing the cleaning port of the FIG. 1 embodiment.
Figure 11:
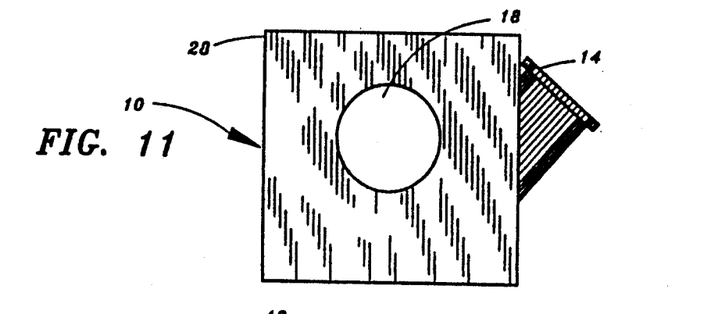
FIG. 11 is a side elevational view of the FIG. 1 embodiment.

FIGS. 1 and 10 show the side wall 30 having an access port 32 formed therethrough for cleaning clogs from the braking chamber 12. FIG. 9 shows particulate matter 60 being discharged from the outlet ports 16 and 18, and FIG. 7 shows generally the path of particulate matter 60 through a preferred embodiment of the apparatus 10.

Figure 14:
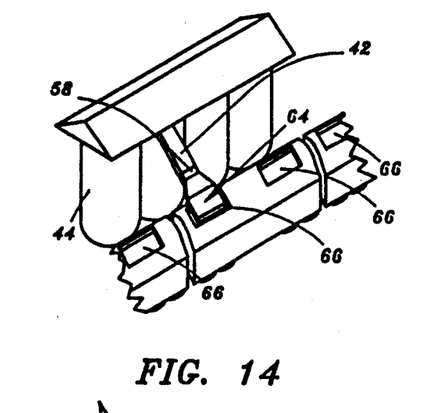
FIG. 14 is a perspective view of a high capacity embodiment of the apparatus loading railroad grain cars at a large scale grain handling facility.

FIGS. 14 through 18 show another embodiment of the apparatus for use in commercial grain handling facilities 44. FIG. 14 shows the apparatus 64 in use loading rail cars through a series of openings 66. Grain is moved from storage containers 44, through an unloading conduit 42, into the inlet port 58, through the junction 68, and onto the curvilinear support surfaces 72 of the high capacity embodiment 64.

Figure 15:
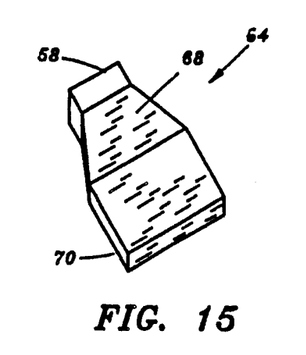
FIG. 15 is a perspective of a high capacity embodiment of the FIG. 14 apparatus.
Figures 16, 17:
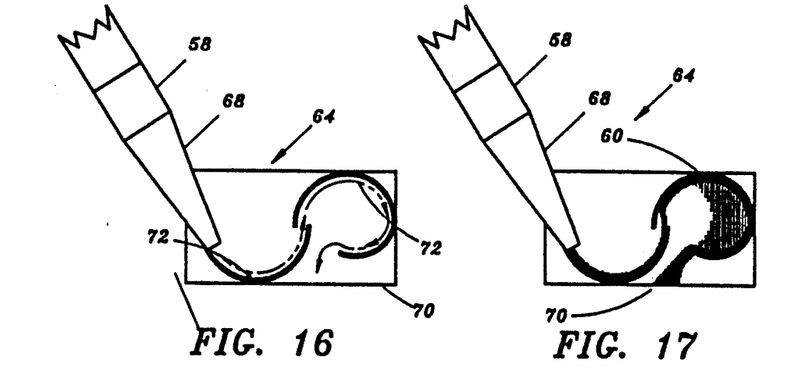
FIG. 16 is a partial sectional side elevational view of the high capacity embodiment of FIG. 14.
FIG. 17 is a partial sectional side elevational view of the high capacity embodiment of FIG. 14.
Figure 18:
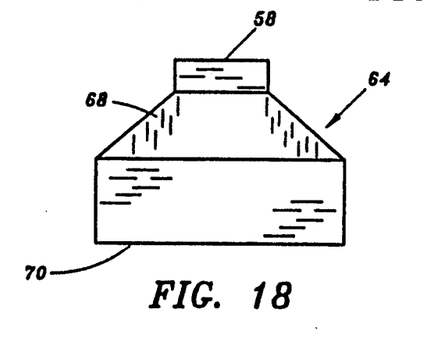
FIG. 18 is a front elevational view of the high capacity embodiment of FIG. 14.

FIGS. 16 and 17 show the path of particulate matter 60, such as grain, through the apparatus 64. The particulate matter 60 is deflected by a series of curvilinear support surfaces 72 so as to reduce the velocity of the particulate matter before its discharge through the outlet port 70. FIGS. 15 and 18 show the high capacity embodiment 64 in various perspective views.

Figure 19:
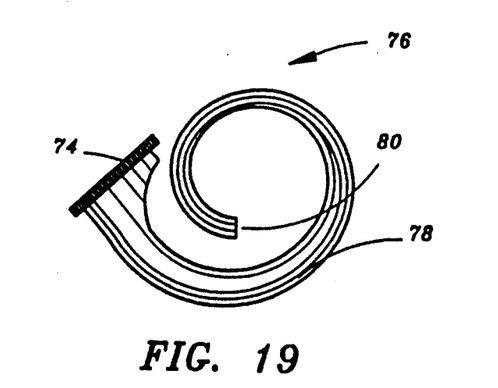
FIG. 19 is side elevational view of a spiral embodiment of the invention.
Figure 20:
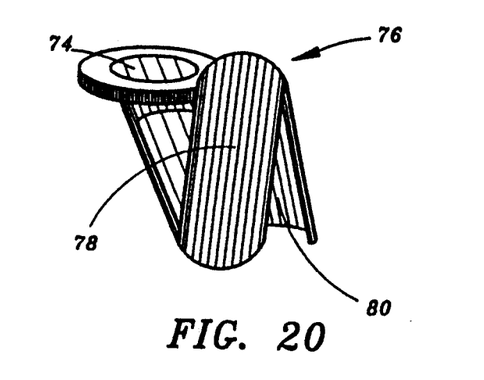
FIG. 20 is a front perspective view of the spiral embodiment of FIG. 19.
Figure 21:
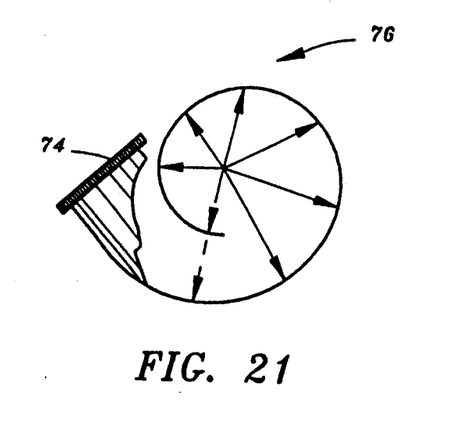
FIG. 21 is a partial sectional side elevational view of the FIG. 19 embodiment showing the gradual reduction in the radius of curvature in the spiraling curvilinear support surface.

Another preferred embodiment 76 is shown by FIGS. 19, 20, and 21. The apparatus 76 includes a braking chamber 78 comprised of a tubular helical support surface connected between an inlet port 74 and an outlet port 80. Particulate matter entering the inlet port 74 is discharged vertically downwardly from the outlet port 80 after being decelerated and laterally offset within the tubular helical support surface of the braking chamber 78. In this fashion the velocity of a high volume stream of particulate matter may be reduced without clogging the apparatus 76.

Whereas, the material from which the apparatus is formed is not critical to the invention, a preferred embodiment may be fabricated from steel. Likewise, the dimensions of the invention may vary so as to best conform to any particulate matter storage facility configuration.

Whereas, the invention has been described in connection with preferred embodiments thereof, it is apparent that many additions, modifications and substitutions may be made which are within the intended broad scope of the appended claims.

Thus, there has been shown and described an improved method and apparatus for reducing the velocity of a stream of particulate matter which accomplishes at least all of the stated objects.

What is claimed:

1. An apparatus for reducing the velocity of a stream of a flowable substance falling in a downwardly inclining conduit, comprising,
   a flowable substance braking chamber, having
      an inlet port adapted for accepting a flowable substance from a conduit, and
      an outlet port adapted for discharging a flowable substance,
   a curvilinear support surface having opposing ends connected to said ports,
   said curvilinear support surface including an ascending arcuate portion between said inlet port and said outlet port, and
   said curvilinear support surface decreasing incrementally between said inlet and outlet port so as to form a spiral providing both the upper and lower surfaces of said braking chamber whereby the velocity of a stream of said flowable substance is reduced before discharge to prevent damage to said flowable substance.

2. The apparatus of claim 1 wherein the radius of curvature of said curvilinear support surface gradually decreases between said inlet and outlet.

3. The apparatus of claim 1 wherein the cross-sectional area of the outlet is larger than the cross-sectional area of the inlet.

4. The apparatus of claim 1 wherein said curvilinear support surface is polished to reduce friction.

5. The apparatus of claim 1 wherein said braking chamber has formed therein an opening for cleaning clogs that might occur within the chamber formed by said curvilinear support surface.

6. The apparatus of claim 1 wherein there is provided a plurality of said outlet ports.

7. The apparatus of claim 1 wherein said curvilinear support surface comprises first and second surfaces,
   said first surface comprising an upwardly ascending curvilinear surface whereby particulate matter received from the inlet port is directed upwardly,
   said second surface being offset rearwardly from the upper end of said first surface and curving upwardly, forwardly, and downwardly for directing particulate matter upwardly, forwardly, and downwardly in an arcuate path for discharge from said second surface, and
   means for supporting said first and second surfaces.

8. The apparatus of claim 7 wherein the forward end of the second surface is generally vertical for downward discharge of said particulate matter.

9. The apparatus of claim 1 wherein said outlet port faces downwardly and said curvilinear support surface comprises a generally helical shaped structure whereby particulate matter traversing said helix is laterally offset for discharge from said downwardly facing outlet port.

10. A method of cushioning a stream of particulate matter falling in a downwardly inclining conduit, said method comprising,
    providing a flowable substance braking chamber having an inlet, an outlet, and a helical support surface having an ascending arcuate portion,
    directing said stream of particulate matter into said inlet and upwardly over said ascending arcuate portion such that the velocity of said particulate matter is reduced, and
    discharging said particulate matter from said outlet.

11. The method of claim 10 further comprising incrementally decreasing the radius of curvature of the helical support surface thereby increasing the rate at which the particulate matter decelerates as it passes over the helical support surface.

12. An apparatus for reducing the velocity of a stream of a flowable substance falling in a downwardly inclining conduit, comprising,
  a flowable substance braking chamber, having
    an inlet port adapted for accepting a flowable substance from a conduit, and
    an outlet port adapted for discharging a flowable substance,
  a curvilinear support surface having opposing ends connected to said ports,
  said curvilinear support surface including an ascending arcuate portion between said inlet port and said outlet port, whereby the velocity of a stream of said flowable substance is reduced before discharge to prevent damage to said flowable substance, and
  said radius of curvature of said curvilinear support surface gradually decreases between said inlet and outlet.

13. An apparatus for reducing the velocity of a stream of a flowable substance falling in a downwardly inclining conduit, comprising,
  a flowable substance braking chamber, having
    an inlet port adapted for accepting a flowable substance from a conduit, and
    an outlet port adapted for discharging a flowable substance,
  a curvilinear support surface having opposing ends connected to said ports,
  said curvilinear support surface including an ascending arcuate portion between said inlet port and said inlet port, whereby the velocity of a stream of said flowable substance is reduced before discharge to prevent damage to said flowable substance, and
  said outlet port faces downwardly and said curvilinear support surface comprises a generally helical shaped structure whereby particulate matter traversing said helix is laterally offset for discharge from said downwardly facing outlet port.

14. A method of cushioning a stream of particulate matter falling in a downwardly inclining conduit, said method comprising,
  providing a flowable substance braking chamber having an inlet, an outlet, and a curvilinear support surface having an ascending arcuate portion,
  incrementally decreasing the radius of curvature of the curvilinear support surface thereby increasing the rate at which the particulate matter decelerates as it passes over the curvilinear support surface,
  directing said stream of particulate matter into said inlet and upwardly over said ascending arcuate portion such that the velocity of said particulate matter is reduced, and
  discharging said particulate matter from said outlet.

* * * * *